United States Patent [19]
Vann

[11] 3,922,361
[45] Nov. 25, 1975

[54] SOFT FROZEN ALL-NATURAL FRUIT JUICE
[76] Inventor: Edwin L. Vann, 803 Fox Hall, Lakeland, Fla. 33803
[22] Filed: Jan. 4, 1974
[21] Appl. No.: 430,715

Related U.S. Application Data
[63] Continuation-in-part of Ser. No. 276,254, July 28, 1972, abandoned.

[52] U.S. Cl. .............. 426/599; 426/658; 426/655; 426/385; 426/387; 62/69
[51] Int. Cl.² ...................... A23L 2/02; A23L 2/08
[58] Field of Search ........... 426/190, 189, 185, 166, 426/164, 384, 385, 380, 327, 356, 387, 388, 213, 206, 365; 62/69

[56] References Cited
UNITED STATES PATENTS

| | | | |
|---|---|---|---|
| 2,087,077 | 7/1937 | Wadsworth et al. | 426/380 |
| 2,588,337 | 3/1952 | Sperti | 426/384 |
| 3,140,187 | 7/1964 | Brent | 426/387 X |
| 3,227,562 | 1/1966 | Houghtaling et al. | 426/190 |
| 3,310,410 | 3/1967 | Lang et al. | 426/387 |
| 3,391,009 | 7/1968 | Fehlberg et al. | 426/388 X |
| 3,483,032 | 12/1969 | Stern et al. | 426/380 X |
| 3,594,193 | 7/1971 | Mishkin et al. | 426/164 X |
| 3,619,205 | 11/1968 | LeVan et al. | 426/190 |
| 3,647,476 | 3/1972 | Swisher | 426/190 X |
| 3,764,710 | 10/1973 | Inagmi et al. | 426/185 |
| 3,773,961 | 11/1973 | Gordon | 426/190 X |

OTHER PUBLICATIONS

"Lactose," Applications Manual, 1964, Formost Daries Inc. 1870, El Camino Real, Buhingame, Calif. pp. 3, 11, 23, 24.

Primary Examiner—Arthur D. Kellogg
Assistant Examiner—Kenneth M. Schor
Attorney, Agent, or Firm—Stein & Orman

[57] ABSTRACT

A process for producing a unique soft frozen all-natural fruit juice wherein an orange base concentrate is provided to which water and an inert gas are mixed to provide the juice. The concentrate is thawed from a frozen state, after which lactose, natural sweetener and natural flavoring are added. The concentrate is then slush frozen.

2 Claims, No Drawings

SOFT FROZEN ALL-NATURAL FRUIT JUICE

This is a continuation-in-part application of my copending application Ser. No. 276,254 filed July 28, 1972, now abandoned.

BACKGROUND OF THE INVENTION

1. Field of the Invention

This invention relates to a process for producing a unique soft frozen all-natural fruit juice.

2. Description of the Prior Art

The recent upsurge in popularity of soft frozen ice cream and drinks has led to a desire to produce a soft frozen all-natural fruit juice. This desire has not, to date, been attained because natural fruit juice will not produce a product which is acceptable to a consumer, without the addition of emulsifiers, stabilizers, and artificial coloring. Even when these are added to a base fruit concentrate, the end product has an artificial, or off-flavor not like that of the natural fruit juice.

A further problem is that if natural fruit juice is stored a certain length of time, it will lose its vitamin content and flavor. It is well known in the food industry that orange juice is particularly one of the most difficult products to store and serve without the loss of vitamin C and the natural orange flavor.

In addition, when a person eats a frozen product, the taste buds are partially anesthetized and a sweet orange juice tastes more tart. In order to adjust this taste, one must add high potentency sweeteners, such as saccharin, calcium cyclamate, or other like artificial sweeteners singularly or in combination to attain the desired sweetness. Such artificial sweeteners are receiving less acclaim and even disapproval of the Food and Drug Administration so that it will eventually be impossible to market such a sweetened soft frozen fruit juice.

If a natural sweetener, such as dextrose, sucrose, fructose and similar sugars, are used, the Brix of the concentrate is deleteriously affected. The concentrate gets extremely viscous whereby it becomes impossible to pour and is extremely sticky. Obviously, such a condition is detrimental to the sanitation that is currently required by the Health Authorities.

SUMMARY OF THE INVENTION

Objectives

It is an object of this invention to produce an all-natural, fruit juice in soft frozen form without using emulsifiers, stabilizers, artificial color, artificial sweeteners, or other similar artificial agents.

Another object is to provide an all-natural soft frozen fruit juice which has retained a natural fresh flavor similar to that of the natural unfrozen fruit juice.

Still another object is to provide means to sweeten said fruit juice without deleteriously affecting the Brix of the base concentrate therefor.

A further object is to standardize the quasi sugar/acid ratio of the finished soft frozen pure fruit juice so that the frozen product gives the impression to the consumer that it is sweet like fresh fruit juice.

A still further object is to provide a plurality of soft frozen all-natural fruit juices, singularly or in combination and a process for making same.

Another object is to provide a base concentrate for a soft frozen all-natural fruit juice which is stable at all times and which will not cause difficulties in the machine.

Another object is to provide a process which will produce a pure fruit juice with all the characteristics of soft frozen ice cream or sherbert.

Other objects of the invention will in part be obvious and will in part appear hereinafter.

Broad Statement of the Invention

A process has now been devised which produces a unique soft frozen all-natural fruit juice composition. In its broadest form the process comprises forming an intermediate concentrate from a frozen base concentrate of the desired Brix by thinning and adding thereto the required quantity of the natural sweetener lactose sugar, along with natural flavoring. It is then packaged into a convenient size. At the site of use, the intermediate concentrate is then further diluted and whipped with or without an inert gas to provide the unique soft frozen all-natural fruit juice which corresponds in taste and appearance with the natural fruit juice to effect a corresponding similarity in taste and appearance to the natural fruit juice.

The base concentrate that is used (for an orange juice product) should preferably have the following:

1. Brix — 42.0° to 58.0°. Brix is defined as an arbitrary hydrometer scale for expressing the specific gravity of liquids, especially sugar solutions, according to the formula:
    specific gravity = $400/(400+n)$ at $15.6°C$
    wherein $n$ represents the reading on the scale.
2. Sugar/acid ratio — 14.0:1 to 17.5:1
3. Oil — 0.014 to 0.018 add back and preferably of the Valencia type
4. No floating pulp.
5. Bottom and suspended pulp — 9–11%
6. Enzyme active — totally deactivated (less than 1.5 P.E.U., and preferably zero, rating by USDA method, for minimum separation and maximum stability.)
7. No gelation or separation.
8. Color, flavor and odor shall be that of mid-season or Valencia fruit as determined by USDA methods, i.e. score of 93 or better, (Minimum of 19 score for defects.), and rated grade A for concentrated orange juice for manufacturing under federal or Florida Citrus Code Standards
9. Total pectin in milligrams per 100 grams of concentrate — maximum 375.
10. Viscosity — maximum 3,000 centipoise.
11. No product to be produced before January (for Florida fruit) of any producing year or until all fruit to be used shall be completely matured.

The following are the finished product standards and machine and product critical data:

1. Product shall have the appearance of soft serve ice cream or sherbert. Texture to be heavy enough to stand in a 6 oz. cup and be eaten with a spoon or through a large straw.
2. Finished Product Discharge Temperature.
    a. Orange Juice — Range 25°–27° F, Optimum Temperature — 26°
    b. Flavored Blends — Range 25°–27°, Optimum Temperature — 26°
    c. Grape Juice — Range 27°–30° F, Optimum Temperature — 28° F.
    d. Apple Juice — Range 27°–30° F, Optimum Temperature —28° F
3. Quasi sugar/acid ratio — Range 20:1 –25:1, Optimum 21.75:1

4. Overrun of frozen produce, i.e. volume of liquid juice vs. volume of whipped finished frozen product.
   a. Without inert gas expansion — Range 15–30%, Optimum 20%
   b. With inert gas expansion — Range 40–60%, Optimum 50%

DETAILED DESCRIPTION OF THE PREFERRED EMBODIMENT

In order to more clearly define the operation and procedure of this invention, Example I which follows is given with regard to the production of an end product of soft frozen all-natural orange juice. However, other juices or combinations of juices such as orange/lemon juice; orange/fruit punch juice; orange/lime juice; orange/strawberry juice; orange/pineapple juice; orange/grapefruit/pineapple juice; orange/banana juice; grape juice; apple juice; and other applicable pure fruit juices and even milk or milk blends may be used.

EXAMPLE I

Soft Frozen Orange Juice

Fifty-two gallons of an orange base concentrate having a:
Brix: 51.42 (Specific gravity 10.299 lbs/gal.)
Sugar/acid ratio: 14.8
Percent pulp: 10%
Percent oil: 0.160%
P.E.U.: 1.36
Viscosity: 2,500 centipoise
Milligrams of pectin per 100 grams concentrate: 320.4

| Produce Score: | Color | — | 37 |
|---|---|---|---|
| | Flavor | — | 37 |
| | Defects | — | 19 |
| | Total Score | — | 93 | which constitutes USDA Grade A. is preferably placed in a 55 gallon new or reconditioned steel drum with a standard plastic liner. The drum is placed in a freezer and frozen to 0°F. or lower and held at this temperature, as a frozen base concentrate until use in the next step.

In the next step, an intermediate concentrate is prepared which is used in producing the raw, reconstituted juice for production of soft frozen orange juice.

The frozen base concentrate is allowed to thaw from 0°F. to a temperature at which it will pour freely. It is then poured into a suitable container. Up to 10% of tangerine, temple or murcott concentrate is added to improve flavor and color. Then the natural sweetener, lactose sugar, required to bring the sugar/acid ratio to 21.75:1 is added (usually 10–12 lbs. lactose sugar). It will be noted that no substantial increase in Brix occurs. This is in contrast to the use of other natural sweeteners, such as dextrose, sucrose, fructose which cause a substantial increase in Brix.

All of the ingredients are then blended for at least 30 minutes.

Then a taste comparison test is preferably run and if the intermediate concentrate is acceptable, it is fed to a filler which utilizes a positive displacement pump and bottom filling to prevent air entrapment. The product is preferably filled into convenient size containers, such as one-half gallon polyethylene bottles. Polyethylene does not impart a flavor to the product. The filled bottles are then capped and labeled and stored in a 0° storage room for refreezing. Freezing should take approximately 36 hours. Maximum allowable shelf life is 90 days to insure maximum flavor.

At the site of use, the intermediate concentrate is added to a soft frozen freezer machine such as an Ice Slush Freezer, (preferably a Model No. 749 as manufactured by Taylor Freezer Company, Inc. Rockton, Ill.) after it has thawed, on a one to four basis (one-half gallon plus 2 gallons of water) to give the perfect 11.8° to 12.5° Brix raw juice for soft freezing. In its thawed state, the intermediate concentrate should not be stored for more than 14 days since there will be deterioration.

Actuating the freezer will cause correct dilution with water, as indicated, blending, whipping and delivery of the soft frozen all-natural orange juice.

The overrun of the frozen product, i.e., the volume of the liquid juice vs. the volume of whipped frozen product is from 15 to 30%. The optimum overrun is 20%. However, the finished product may be expanded through the use of carbon dioxide, nitrous oxide, nitrogen or other inert gases in addition to the natural overrun caused by freezing and whipping. Hence, with inert gas expansion, the overrun range is from 40 to 60% with the optimum being 50%.

EXAMPLE II

Soft Frozen Mixed Fruit Juice

Eight ounces of a 70 Brix mixture, by taste, of
Apricot
Apple
Pineapple
Boysenberry
Lime
are added to 1 gallon of an orange base concentrate as set forth in Example 1 and the same procedure as therein described is used to make a soft frozen all-natural mixed fruit juice.

EXAMPLE III

Soft Frozen Orange Pineapple Juice

One pint of 78 Brix mixture of: Pineapple is added to 0.5 gallons of the orange base concentrate as set forth in Example I and the same procedure as therein described is used to make a soft frozen all-natural orange pineapple juice.

EXAMPLE IV

Orange Milk

Nine pints of the following non-dairy shake formula:
36 lbs. vegetable fat
36.5 lbs. SNF
106. lbs. of a 76.5 Brix invert sugar
54 lbs. corn sugar
28 lbs. dry granulated sugar
50 lbs. SES
616 lbs. water
20 ounces Vanilla Extract
is added to 2.5 gallons of the intermediate concentrate of Example I and a soft frozen orange milk is produced using the same procedure as therein elicited.

It will thus be seen that the objects set forth above, among those made apparent from the preceding description, are efficiently attained and, since certain changes may be made in carrying out the above process and in the composition set forth without departing from the scope of the invention, it is intended that all matter contained in the above description shall be interpreted as illustrative and not in a limiting sense.

It is also to be understood that the following claims are intended to cover all of the generic and specific features of the invention herein described, as a matter of language, might be said to fall therebetween.

Now that the invention has been described, What is claimed is:

1. A process for the manufacture of soft frozen all-natural orange-based fruit juice comprising the steps of forming an intermediate concentrate from a frozen base concentrate of said orange fruit juice by thawing to substantially 22° F and then adding a natural sweetener, lactose sugar and a natural flavoring thereto, subsequently adding said intermediate concentrate to an icy slush freezer with water and generating said soft frozen all-natural orange-based fruit juice therefrom, wherein said base concentrate has the following characteristics:
   a. Brix = 42.0° to 58.0°;
   b. Sugar/acid ration = 14.0:1 to 17.5:1;
   c. Oil = 0.014 to 0.018 add back;
   d. Enzyme activity = less than 1.5 P.E.U.; and
   e. Total pectin = maximum of 375 milligrams per 100 grams of concentrate;

and wherein said soft frozen all-natural fruit juice has an overrun of:
   f. 15–30% without inert gas expansion, and
   g. 40–60% with inert gas expansion.

2. The process of claim 1 wherein said natural flavoring comprises the natural aroma extract of said fruit.

* * * * *